United States Patent [19]

Peters et al.

[11] Patent Number: 5,376,352
[45] Date of Patent: Dec. 27, 1994

[54] OXYGEN STORAGE AND RETRIEVAL SYSTEM

[75] Inventors: Jonathan A. Peters; Martin Klanchar; Thomas G. Hughes, all of State College; James C. Mankin, Port Matilda, all of Pa.

[73] Assignee: The Penn State Research Foundation, University Park, Pa.

[21] Appl. No.: 132,021

[22] Filed: Oct. 5, 1993

[51] Int. Cl.⁵ .................. C01B 13/02; A62B 21/00
[52] U.S. Cl. ..................... 423/579; 128/202.26; 422/125; 423/499.3
[58] Field of Search .......... 422/120, 125, 129; 252/187.31; 128/202.26, 204.21, 205.18; 423/579, 641, 499.3

[56] References Cited

U.S. PATENT DOCUMENTS

| | | | |
|---|---|---|---|
| 2,558,756 | 7/1951 | Jackson et al. | 422/120 |
| 3,542,522 | 11/1970 | Mausteller | 422/122 |
| 3,615,250 | 10/1971 | Vernon | 422/123 |
| 3,615,251 | 10/1971 | Klenk | 422/122 |
| 3,709,203 | 1/1973 | Cettin et al. | 123/571 |
| 3,725,156 | 4/1973 | Thompson | 149/81 |
| 3,871,281 | 3/1975 | Leonard et al. | 109/29 |
| 3,883,373 | 5/1975 | Sidebottom | 149/6 |
| 3,910,805 | 10/1975 | Catanzarite | 149/83 |
| 3,951,613 | 4/1976 | Kiele | 110/344 |
| 3,964,255 | 6/1976 | Catanzarite | 60/205 |
| 4,632,714 | 12/1986 | Abegg et al. | 149/2 |
| 4,642,147 | 2/1987 | Hyyppa | 149/19.9 |
| 4,671,270 | 6/1987 | Kato | 422/120 X |
| 4,750,483 | 7/1988 | Ankartross et al. | 128/203.26 |
| 4,891,189 | 1/1990 | Harwood, Jr. | 422/165 |
| 4,905,688 | 3/1990 | Vicenzi et al. | 128/204.21 |
| 4,981,655 | 1/1991 | Kolbe et al. | 422/120 X |
| 5,049,306 | 9/1991 | Greer | 252/187.31 |

*Primary Examiner*—Robert J. Warden
*Assistant Examiner*—Robert Carpenter
*Attorney, Agent, or Firm*—Thomas J. Monahan

[57] ABSTRACT

A method and apparatus for storing and retrieving oxygen are provided on a steady flow basis. The temperature of a storage vessel containing lithium perchlorate ($LiClO_4$) in the solid state is raised until a molten bath of the $LiClO_4$ is formed. The molten bath of $LiClO_4$ is maintained at a setpoint temperature which is less than the temperature at which substantial decomposition of the $LiClO_4$ occurs. The molten $LiClO_4$ is then caused to flow from the storage vessel to a reaction vessel whose temperature is raised sufficiently to assure essentially instantaneous and complete decomposition of the $LiClO_4$. Specifically, within the reaction vessel, a spray of the molten $LiClO_4$ is directed toward an internal target surface, upon the impingement with which decomposition of the molten $LiClO_4$ into $LiCl$ and $O_2$ occurs.

18 Claims, 4 Drawing Sheets

OXYGEN STORAGE AND RETRIEVAL SYSTEM

GOVERNMENT SPONSORSHIP

The invention was made with Government support under Contract N00039-88-C-0051 awarded by the U.S. Department of the Navy. The Government has certain rights in the invention.

BACKGROUND OF THE INVENTION

1. Field of the Invention

The present invention relates generally to oxygen storage and retrieval systems and more particularly to such a system which provides an oxygen source which can selectively yield a controllable steady flow of oxygen.

2. Description of the Prior Art

Oxygen is the most abundant element on earth, making up approximately 50% of the planet's mass. Correspondingly, it plays an important role in many biological processes; for example, humans must consume several pounds of oxygen per day. Commercial and medical uses of oxygen are widespread, requiring approximately 20 millions tons of $O_2$ annually.

Pure oxygen is produced primarily through air separation and is stored and shipped as a liquid or compressed gas. Liquid oxygen (LOX) has a critical point temperature of 154.58° K. ($-181$° F.). Thus, cryogenic $O_2$ storage entails bulky insulated tanks and necessitates continuous venting of gas to the atmosphere. Pressurized oxygen gas requires massive cylinders, and since high pressure oxygen can react violently with organic materials, specifically cleaned fittings are required.

Oxygen candles, frequently used for emergency life support, have been a valuable source of $O_2$. Their development can be traced back to the early 1940's when the need for a convenient source of oxygen for emergency use in aircraft and submarines became apparent. Cryogenic and high pressure $O_2$ storage systems were poorly suited for this application because of the inherent bulk, weight, and complexity of the required containment vessels and delivery systems. One solution, developed and refined over the next several decades, was the "oxygen candle". This apparatus uses a pyrotechnic grain which, once ignited, reacts at a specified rate to yield a relatively large quantity of oxygen. A typical candle formulation is given below in Table 1.

TABLE 1

| TYPICAL OXYGEN CANDLE COMPOSITION | | |
| --- | --- | --- |
| Chemical Species | Composition | Purpose |
| $NaClO_3$ | 80% | Oxygen source |
| Fe | 10% | Fuel |
| Fiberglass | 6% | Binder |
| $BaO_2$ | 4% | Chlorine scavenger |

In this type of oxygen candle, iron reacts with a portion of the sodium chlorate to form mixed iron oxides. The heat generated by this highly exothermic reaction melts the remainder of the $NaClO_3$, which decomposes to yield $O_2$ and sodium chloride. Emergency breathing systems based on this type of oxygen candle are in service on most commercial airliners. They have been used as oxygen suppliers for evacuations from underground mine accidents, burning surface ships, and in submarine emergencies.

Typical of the prior art of oxygen candles are the U.S. Pat. Nos. 5,049,306 to Greer, 4,905,688 to Vicenzi et al., 4,891,189 to Harwood, Jr., 3,871,281 to Leonard et al., 3,615,251 to Klenk, 3,615,250 to Vernon, and 3,542,522 to Mausteller. Unfortunately, as in other systems which incorporate pyrotechnic grains (solid rocket motors, for example), there is no convenient way to modify the burn rate or stop the reaction once initiated. Other U.S. Pat. Nos. 4,642,142 to Hyyppa and 4,632,714 to Abegg et al. are concerned with pyrotechnic formulations which may contain some $LiClO_4$ as an oxidizer although none of the compositions mentioned in these patents are intended to serve as sources of pure oxygen.

Each of the oxygen storage options described above has inherent limitations. There is a requirement for a convenient, controllable oxygen source which can be used in applications where cryogenic or high pressure storage are impractical.

A system has been proposed in which liquid $LiClO_4$ would serve as a chemical oxygen source via the reaction:

$$LiClO_4 \rightarrow LiCl + 2O_2 \qquad [1]$$

$LiClO_4$ was chosen for this application for several reasons. First, as shown in Table 2, this species has the highest oxygen storage density of any chlorate or perchlorate.

TABLE 2

| PROPERTIES OF VARIOUS CHEMICAL OXYGEN SOURCES | | | | | |
| --- | --- | --- | --- | --- | --- |
| Material | Density (gm/cm$^3$) | Mass % $O_2$ | Grams $O_2$ gas per cm$^3$ material | Mass needed to produce 1 man-day $O_2$ (grams) | Volume needed to produce 1 man-day $O_2$ (cm$^3$) |
| $LiClO_4$ | 2.43 | 60.1 | 1.45 | 1520 | 626 |
| $NaClO_4$ | 2.53 | 52.0 | 1.31 | 1742 | 689 |
| $KClO_4$ | 2.52 | 46.2 | 1.16 | 1964 | 777 |
| $LiClO_3$ | 1.12 | 53.0 | 0.59 | 1710 | 1526 |
| $NaClO_3$ | 2.49 | 45.1 | 1.13 | 2009 | 808 |
| $KClO_3$ | 2.32 | 39.2 | 0.91 | 2313 | 998 |
| 98% $H_2O_2$ | 1.43 | 46.1 | 0.66 | 2009 | 1373 |
| LOX | 1.14 | 100. | 1.14 | 907 | 797 |

FIG. 2 shows the volumetric oxygen density of several storage media, including liquid $LiClO_4$. Note that a given amount of the molten salt actually contains more oxygen than the same volume of liquid $O_2$.

A second factor which makes this reaction attractive for oxygen generation applications is the fact that $LiClO_4$ is the only perchlorate which is stable at temperatures significantly higher than its melting point, allowing this material to be conveniently handled as a liquid for casting into reaction vessels.

Batch Reactor

Reaction [1] exhibits temperature dependent kinetics. The decomposition of LiClO$_4$ can be characterized as follows;

| TEMPERATURE | 590° F. | 774° F. | 945° F. |
|---|---|---|---|
| REACTION RATE | SLIGHT | RAPID | VIOLENT |

Because of this strong temperature dependence, it was initially assumed that the rate of oxygen production could be controlled by heating and cooling the perchlorate bath.

Although energy is needed to melt the perchlorate and initiate oxygen production, reaction [1] is exothermic. For this reason, the LiClO$_4$ bath requires continual cooling to yield a constant oxygen flowrate. A test apparatus known as "batch reactor", utilized for this purpose maintained the bath temperature by spraying cold water on the outer surface of the reactor. A number of experiments were carried out using this apparatus with disappointing results.

In a typical experiment, the reaction vessel was filled with LiClO$_4$ powder and the cartridge heaters energized to melt the perchlorate. This heating process took approximately 60 minutes. As the temperature of the bath rose, oxygen generation would commence. With constant bath temperature, a relatively steady flow of oxygen could be maintained for 60 to 90 minutes. Eventually, however, an increase in oxygen evolution would become apparent, as evidenced by an increased gas flow, accompanied by a bubbling sound from within the reaction vessel. Several minutes after the onset of increased O$_2$ production, a brief but very intense reaction would take place. Violent gurgling noises from the reaction vessel would give way to a sudden and dramatic flow of gas, usually accompanied by the ejection of significant quantities of LiCl from the exhaust tube. The bath temperature would surge to temperatures on the order of 1200° F. Indeed, bath temperature would increase from 900° F. to 1175° F. in less than 30 seconds. This process was generally accompanied by a rapid rise in reaction vessel pressure.

At this point, the reaction stopped altogether, with no further evidence of oxygen production. While the pressure spike accompanying this reaction was too brief to register on the data acquisition system (which had been set to collect 10 samples per second), it was clear that a very large portion of the total oxygen production took place in this short period of intense gas generation. The most likely explanation for the sudden increase in reaction rate (manifest in every test of the batch oxygen generation apparatus) is that the autocatalytic nature of reaction [1] dominated this final portion of the oxygen production process. The decomposition of LiClO$_4$ is catalyzed by the LiCl reaction product. For a given temperature, the maximum rate of reaction [1] occurs when the LiClO$_4$ reactant becomes saturated with the LiCl product. In addition to the autocatalytic effect noted above, the exothermic nature of the reaction appears to have played a significant role in the rapid surge of oxygen production associated with batch tests. The decomposition of LiClO$_4$ took place so rapidly that the spray coolant system was unable to remove the heat generated by this process. The resulting increase in temperature also contributed to the runaway nature of the reaction.

Thus, it became clear that the chemical kinetic factors caused the batch oxygen generation system to be impractical.

In U.S. Pat. No. 3,709,203 to Cettin et al., a system is disclosed in which O$_2$ produced from LiClO$_4$, is used in place of atmospheric oxygen in an internal combustion engine. Although the gas generator portion of the Cettin et al. system is intended to serve as a controllable source of pure oxygen, it uses hot engine exhaust to raise the temperature of the perchlorate canister to the point at which a desired rate of O$_2$ generation is achieved. In the operation of the Cettin et al. system, the thermal energy and the lithium chloride products remain in the perchlorate canister. Increased temperatures and higher concentrations of LiCl both have the effect of increasing the reaction rate, which in turn results in the production of more thermal energy and higher LiCl levels. These factors eventually combine to cause a sudden acceleration in oxygen production, which undesirably requires very rapid removal of heat to effect control in a thermally regulated system. Following the sudden acceleration of oxygen production, the system falls silent.

This is simply another variation of the batch oxygen generation system which, as described above, has been tried with disappointing results.

SUMMARY OF THE INVENTION

It was with knowledge of the foregoing that the present invention was conceived and has now been reduced to practice. According to the invention, a method and apparatus for storing and retrieving oxygen at any desired flow rate is provided. The temperature of a storage vessel containing lithium perchlorate (LiClO$_4$) in the solid state is raised until a molten bath of the LiClO$_4$ is formed. The molten bath of LiClO$_4$ is maintained at a setpoint temperature which is less than the temperature at which substantial decomposition of the LiClO$_4$ occurs. The molten LiClO$_4$ is then caused to flow from the storage vessel to a reaction vessel whose temperature is raised sufficiently to assure essentially instantaneous and complete decomposition of the LiClO$_4$. Specifically, within the reaction vessel, a spray of the molten LiClO$_4$ is directed toward an internal target surface, upon the impingement with which decomposition of the molten LiClO$_4$ into LiCl and O$_2$ occurs.

It is an object, therefore, to provide an oxygen storage and retrieval system according to which the oxygen source is lithium perchlorate and utilizes a steady flow operation for releasing the oxygen from the source and delivering it to a desired end use.

Another object of the invention is to provide such a system which is of simplified design and can be readily used.

A further object of the invention is to provide such a system which is economical to build and to operate.

Yet another object of the invention is to provide such a system in which a by-product, LiCl, present at an elevated temperature, serves as a catalyst to continue the process without substantial additional expenditure of energy.

Still another object of the invention is to provide such a system in which the process can be interrupted, then restarted, without substantial difficulty.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 1:
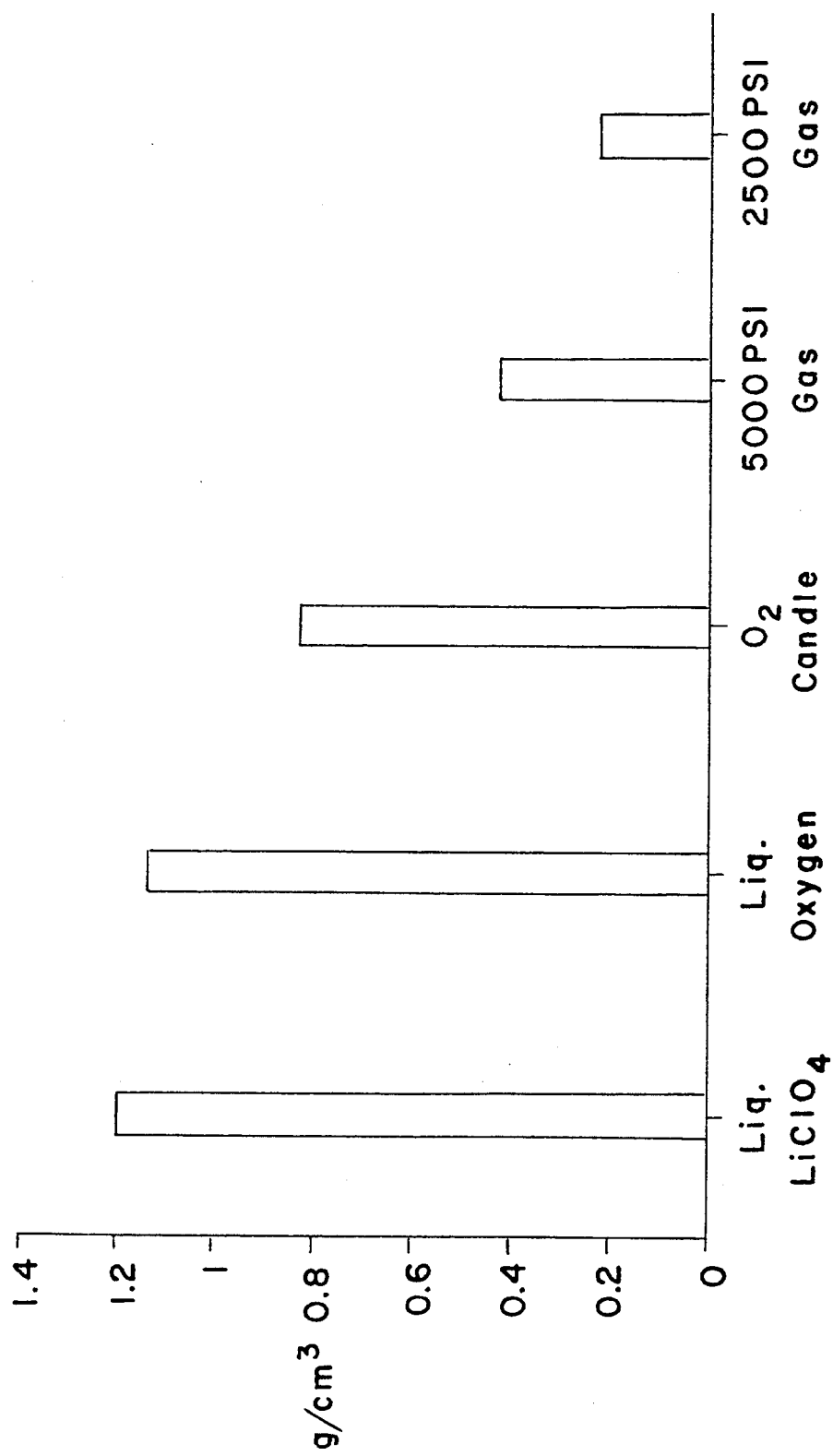
FIG. 1 is a bar chart presenting the volumetric oxygen density of several storage media, including liquid $LiClO_4$.

Turn now to the drawings and, initially, to FIG. 1 which is a bar graph depicting the volumetric oxygen density of several storage media. It has previously been noted that oxygen is necessary for thousands of important biological and commercial processes. Currently, oxygen is transported and stored as either a compressed gas or a cryogenic liquid. Both of these methods have drawbacks. Compressed gas storage involves bulky high pressure tanks and requires a considerable volume and weight for a given mass of oxygen. Liquid oxygen (LOX) storage is quite efficient from a volumetric standpoint, but heavy insulation and the need for continuous venting of storage vessels makes the use of LOX impractical in many circumstances. In addition, there are a number of safety considerations associated with each of these storage methods which complicate their use in some situations.

It was also noted, earlier, that to address these problems, a number of designs for oxygen candles have been developed. These pyrotechnic devices currently in use, for example, on commercial and military aircraft for emergency life support, use chlorates and/or perchlorates to produce a steady flow of oxygen gas. Unfortunately, current oxygen candles react at a fixed rate, that is, once initiated, these devices produce $O_2$ at a flowrate which cannot be modified or stopped and restarted, but must continue to conclusion.

Perchlorate salts, which decompose to yield oxygen gas have long been recognized as potential media for $O_2$ storage. While it is theoretically possible to control the rate of oxygen generation from these chemicals by maintaining a desired temperature in a molten perchlorate bath, experiments have indicated that his "batch type" approach is impractical.

Figure 2:
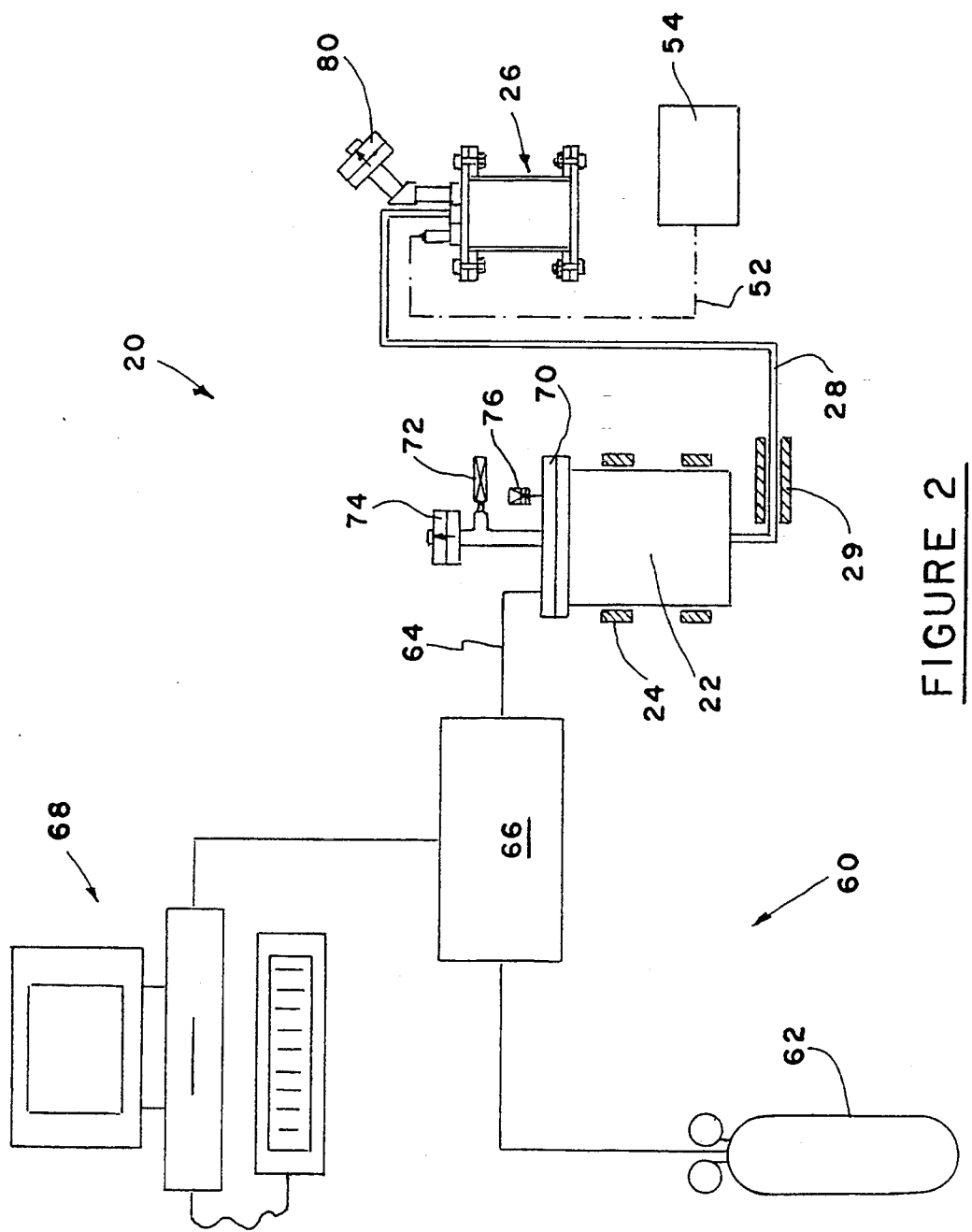
FIG. 2 is a diagrammatic view schematically illustrating the oxygen storage and retrieval apparatus embodying the present invention.

FIG. 2 depicts an oxygen storage and retrieval system 20 which utilizes $LiClO_4$ as the oxygen source which is to be decomposed to yield oxygen gas. As such, the system 20 embodies the present invention. The system 20 includes a storage vessel 22 which is capable of being pressurized for receiving $LiClO_4$ in solid, for example, granular or crystalline, form. Alternatively, the storage vessel can be filled with molten $LiClO_4$ which then solidifies into a solid block with a much greater bulk density than the granular material. This ability to handle perchlorate as a liquid is therefore advantageous.

Suitable heaters 24, which may be electrically energized band heaters, are provided which may encircle the exterior of the storage vessel 22. They are employed to raise the temperature of the storage vessel until its contents become a molten bath. The perchlorate becomes a molten bath at 457° F. It is necessary to heat it beyond this point in order that the adiabatic flame temperature of reaction [1] be higher than the melting point temperature of the lithium chloride product. In other words, if the perchlorate were too cool when sprayed into the reaction chamber, the products would eventually solidify, which would reduce the effectiveness of the chloride catalyst. In actuality, initial perchlorate temperatures ranging from 520° F. to 600° F. are acceptable. This range of temperatures is referred to as a "setpoint" temperature. At the setpoint temperature, the $LiClO_4$ is molten, yet substantial decomposition of the $LiClO_4$ does not yet occur.

The system 20 also includes a reaction vessel 26 which is operatively connected to the storage vessel 22 by means of a suitable conduit 28. The conduit 28 is preferably wrapped with electrical heating tape for its entire length, then suitably insulated to substantially prevent heat loss. A heater is diagrammatically illustrated at 29. In the event the conduit 28 is very short, it may not need to be heated.

Figure 3:
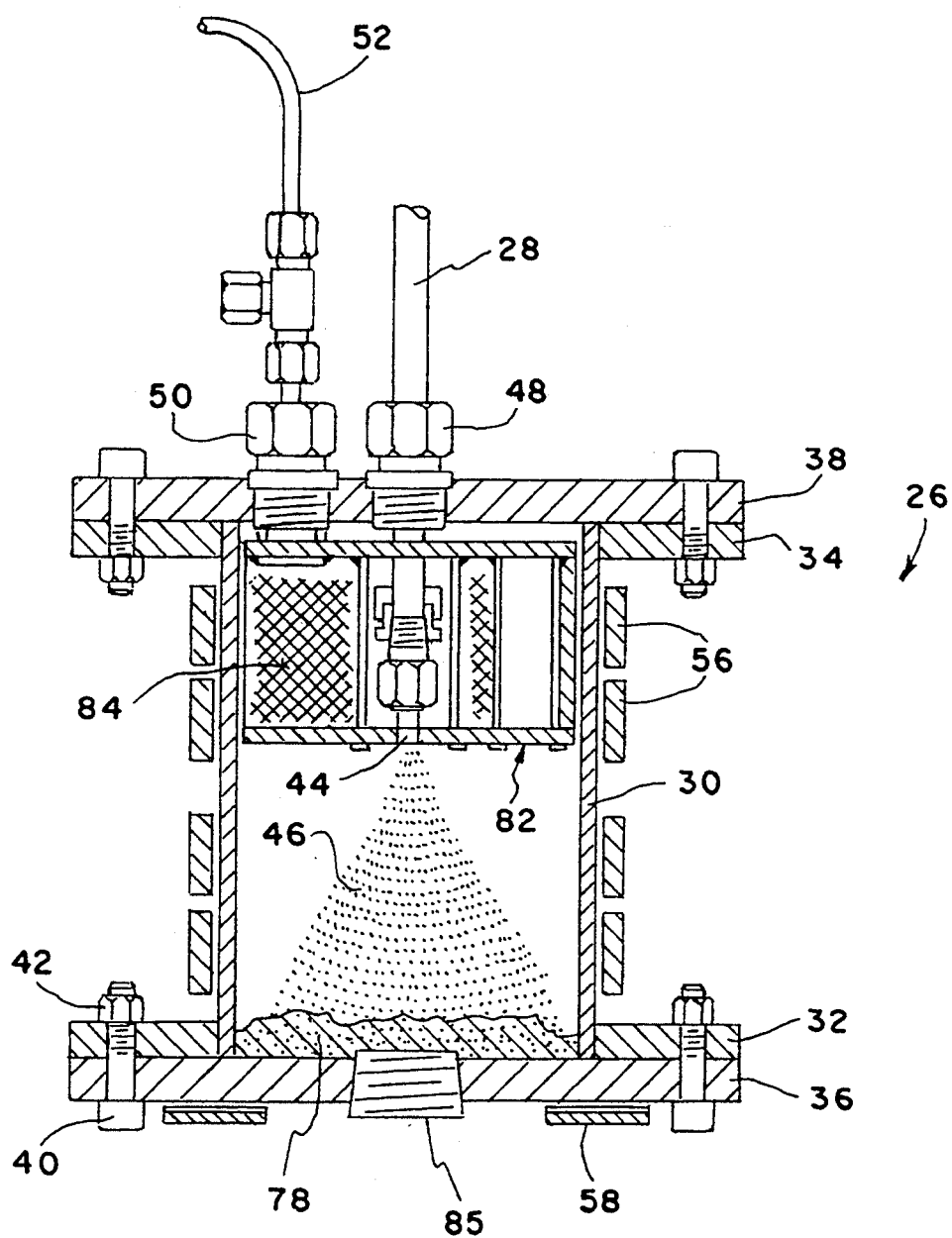
FIG. 3 is a detailed view, in section, of a reaction vessel which is part of the apparatus depicted in FIG. 2.

The reaction vessel 26 may be of any suitable shape and size. As illustrated in FIG. 3, the reaction vessel 26 includes a cylinder 30 to the opposite ends of which are welded or otherwise suitably secured annular flanges 32, 34. Opposed end walls 36, 38 are secured to the annular flanges 32, 34 respectively, as by bolts 40 and associated nuts 42 threaddidly engaged with the bolts. In this manner, the end walls 36, 38 overlie and seal off the opposite ends of the cylinder 30. A spray nozzle 44 is suitably mounted on the end wall 38 and positioned to direct a spray 46 onto an internal surface of the end wall 36. The nozzle 44 is in communication with the conduit 28, the end wall 38 being suitably drilled and tapped to receive a fitting 48 which serves both to mount the nozzle 44 and to receive the end of the conduit 28 distant from the storage vessel 22.

At another drilled and tapped location in the end wall 38, another fitting 50 serves to mount one end of an oxygen withdrawal line 52 which leads to an end use station 54 which may be, for example, a prime mover or a further storage device.

As with the storage vessel 22, the reaction vessel 26 may be provided with a plurality of electrically energized band heaters 56 encircling the cylinder 30 and may additionally be provided with a ring heater 58 affixed to the external surface of the end wall 36. It will be understood that while the heaters 56 and, earlier in the description, the heaters 24, have been described as being electrically energized, a convenient approach, such is only for purposes of illustration. A number of alternative heating arrangements are available which would be within the scope of the invention. Without limitations, such alternative heating systems might include various pyrotechnic systems and the use of waste or exhaust heat from engines served by the oxygen generator.

Return now to FIG. 2 for a description of a flow inducing mechanism 60 by means of which molten LiClO$_4$ is caused first to flow from the storage vessel 22 through the conduit 28 and into the reaction vessel 26, then oxygen gas retrieved from the LiClO$_4$ is caused to flow from the reactor vessel 26 through the withdrawal line 52 to the end use station 54. The mechanism 60 includes a source 62 which may be, for example, a pressurized gas cylinder filled with argon. Argon is desirable because it is inert, safe to use, and relatively inexpensive. Oxygen gas may also be used since that is the end product of the entire system 20. It will be appreciated, in this latter event, that the amount of oxygen utilized for purposes of the flow inducing mechanism 60 is very small when compared to the volume of oxygen gas to be produced by the system 20. In any event, gas from the source 62 is directed to the storage vessel 22 via line 64 and a pressure regulator 66 in the line. A commercially available pressure regulator which has been found to be satisfactory for the purposes of the invention is an electro-pneumatic pressure regulator referred to as model BB1 sold by Proportion-Air, Inc. of McCordsville, Ind. The pressure regulator 66 is operated under the control of a suitable computer 68, the object of the pressure regulator 66 and its associated computer 68 being to assure that a proper rate of flow of molten LiClO$_4$ through the system will be achieved.

In order to initiate the process of the invention, a selected amount of LiClO$_4$ is introduced to the storage vessel 22 after which a suitable cover 70 is closed and sealed. The heaters 24 are then operated to heat the storage vessel 22 and raise the temperature sufficiently to melt the LiClO$_4$. This setpoint temperature of approximately 550° F. is a preferred temperature in that the LiCLO$_4$ becomes molten but is not so high as to cause decomposition of that material.

Flow of the molten LiClO$_4$ out of the storage vessel 22 is induced by the mechanism 60 as described above. That is, the molten LiClO$_4$ is caused to flow out of the storage vessel 22, through the conduit 28 which is similarly heated to a temperature of approximately 550° F., for delivery to the reaction vessel 26. For safety reasons, the storage vessel 22 is provided with a pressure relief valve 72 and suitable burst disks 74 for relieving excessive pressure, should it occur. Also, a pressure transducer 76 serves to continuously monitor the pressure within the storage vessel.

As seen in FIG. 3, the band heaters 56 are operable to raise the temperature in the reaction vessel 26 to a temperature in the range of 1200° F. to 1300° F. This is a range within which decomposition of the LiClO$_4$ readily occurs. Thus, as the spray 46 of liquid LiClO$_4$ impinges on the end wall 36 after issuing from the nozzle 44, it decomposes to form molten LiCl which, as indicated at 78, forms on the end wall 36 and into O$_2$ which is carried off through the withdrawal line 52. It is also noteworthy that the presence of the molten LiCl 78 which forms on the endwall 36 serves as a catalyst for riding in the continued and even more rapid decomposition of the LiClO$_4$ as it issues from the nozzle 44. The pressure imparted to the storage vessel 22, and continuing throughout the remainder of the system 20 caused by the flow inducing mechanism 60, is adequate to assure continued flow of the O$_2$ eventually to the end use station 54. As in the instance of the storage vessel 22, the reaction vessel 26 is provided with burst disk 80 (FIG. 2) to guard against any harm thereto should excessive pressure occur.

Within the reaction vessel 26 is suitably mounted a separator assembly 82 adjacent the nozzle 44 and supporting a filter 84 proximate to the outlet in end wall 38 to the oxygen withdrawal line 52. This device is basically a filter used to remove any droplets of molten lithium chloride which might otherwise be entrained in the oxygen gas leaving the reaction vessel 26. The separator assembly may be in the form of a can filled with metal mesh packing, for example.

A plug 85 is diagrammatically illustrated in FIG. 3 in threaded engagement with the endwall 36. Removal of the plug 85 provides ready access to the interior of the cylinder 30 for removal of the LiCl 78 after there has been a substantial accumulation thereof. Of course, the plug is not to be removed until operation of the system 26 shall have terminated. It is also noteworthy that LiCl is water soluble. This characteristic improves the ease of cleaning the reaction vessel after operation thereof has been terminated.

Operation of the system 20 may continue until all of the LiClO$_4$ in the storage vessel 22 shall have been consumed. However, it should be clearly understood that the system 20 has the capability of terminating operations before all of the LiClO$_4$ has been expended, then restarting operations at a later time. There is no practical limit to the number of times that operations can be commenced, then terminated, then re-commenced, and it has no deleterious effect either on the retrieval of oxygen gas or harm to the system.

While the system 20 envisions a selected amount of LiClO$_4$ being introduced to the storage vessel 22, before commencing operations, it is within the scope of the invention to consider a system in which LiClO$_4$ is continuously introduced to the storage vessel 22 thereby enabling the continuous production of oxygen gas.

Figure 4:
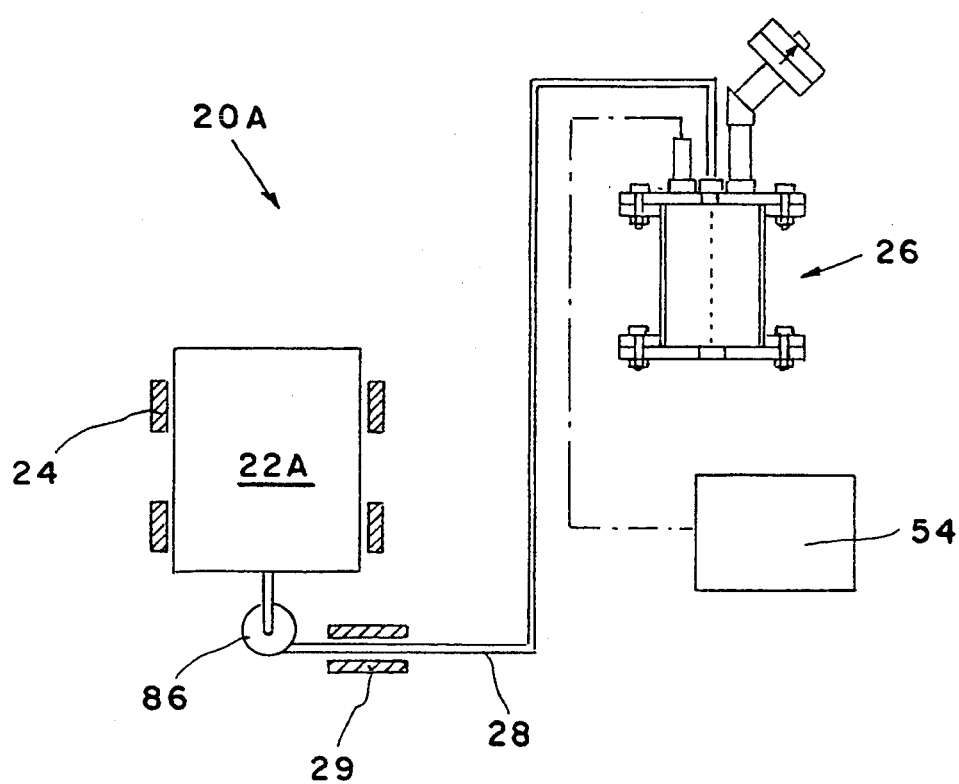
FIG. 4 is a detailed diagrammatic view schematically depicting modified oxygen storage and retrieval apparatus.

It is also within the scope of the invention to replace the flow inducing mechanism 60. To this end, viewing FIG. 4, a modified system 20A utilizes a modified storage vessel 22A which need not be of the pressurized variety. As in the previous embodiment, LiClO$_4$ in the solid form is introduced to the interior of the storage vessel, then is heated by the band heaters 24 as previously described. However, in place of the flow inducing mechanism 60, a suitable pump 86 is provided in the conduit 28 for inducing flow of the molten LiClO$_4$ from the storage vessel 22A to the reaction vessel 26. In all other respects, the modified system 20A operates in the manner of the system depicted in FIG. 2.

While preferred embodiments of the invention have been discussed, they have been disclosed in detail, it should be understood skilled in the art that various other modifications may be made to the illustrated embodiments without departing from the scope of the invention as described in the Specification and defined in the appended claims.

We claim:

1. Oxygen storage and retrieval apparatus comprising:
   a storage vessel for receiving LiClO$_4$ in the solid state;
   first heating means for raising the temperature of said storage vessel until a bath of molten LiClO$_4$ is formed and for holding the molten bath at a set point temperature less than the temperature at which substantial decomposition of the LiClO$_4$ occurs;
   a reaction vessel having at least one internal surface including a target surface;

second heating means for raising the temperature of said internal surface to a decomposition temperature having a magnitude substantially higher than the temperature at which LiClO$_4$ is maintained in said storage vessel;

conduit means interconnecting said storage vessel and said reaction vessel;

flow inducing means for causing the molten LiClO$_4$ to flow from said storage vessel to said reaction vessel;

nozzle means within said reaction vessel in communication with said conduit means for directing a spray of the molten LiClO$_4$ toward said target surface and causing decomposition of the molten LiClO$_4$ into LiCl and O$_2$ to occur when the molten LiClO$_4$ impinges on said heated target surface.

2. Oxygen storage and retrieval apparatus as set forth in claim 1 wherein said storage vessel is a pressurized vessel; and wherein said flow inducing means includes:

a source of pressurized gas; and control means for selectively subjecting said storage vessel to said pressurized gas to thereby cause the molten LiClO$_4$ to flow from said storage vessel to said reaction vessel.

3. Oxygen storage and retrieval apparatus as set forth in claim 1 wherein said flow inducing means includes a pump in operable communication with said conduit means.

4. Oxygen storage and retrieval apparatus as set forth in claim 1 wherein said storage vessel includes pressure relief means for venting said storage vessel when the pressure therein exceeds a predetermined value.

5. Oxygen storage and retrieval apparatus as set forth in claim 1:

wherein said reaction vessel is defined by opposing endwalls and by at least one sidewall intermediate said endwalls;

wherein said nozzle means is supported on one of said endwalls;

wherein said target surface is on the other of said endwalls; and wherein said nozzle means is positioned to direct the spray of the molten LiClO$_4$ toward said target surface.

6. Oxygen storage and retrieval apparatus as set forth in claim 1 further comprising:

third heating means for raising the temperature of said conduit means to approximately the setpoint temperature.

7. Oxygen storage and retrieval apparatus as set forth in claim 1:

wherein said first heating means is effective to raise the temperature of said storage vessel to a setpoint temperature of approximately 550° F.; and wherein said second heating means is effective to raise the temperature of said internal surfaces of said reaction vessel to a decomposition temperature in the range of approximately 1,200° F. to 1,300° F.

8. Oxygen storage and retrieval apparatus as set forth in claim 1 further comprising:

a repository for receiving O$_2$ generated in said reaction vessel; and means for delivering the O$_2$ from said reaction vessel to said oxygen repository.

9. Oxygen storage and retrieval apparatus as set forth in claim 1 wherein said reaction vessel includes pressure relief means for venting said reaction vessel when the pressure therein exceeds a predetermined value.

10. Oxygen storage and retrieval apparatus as set forth in claim 1 wherein said reaction vessel is generally cylindrical and includes:

first and second opposing endwalls; and a substantially continuous sidewall integral with and extending between said first and second endwalls;

said endwalls and said sidewall having internal surfaces defining a chamber;

wherein said target surface is on said second endwall;

wherein said nozzle means is mounted on said first endwall centrally positioned within the chamber intermediate said endwalls and said internal surfaces of said sidewall so as to direct the spray of the molten LiClO$_4$ toward said target surface;

wherein said second heating means includes:

a plurality of band heaters contiguous with the outer surface of said sidewall; and a ring heater contiguous with the outer surface of said second endwall.

11. Oxygen storage and retrieval apparatus as set forth in claim 8 including:

filter means within said reaction vessel for removing from the O$_2$ any droplets of LiCl entrained therein prior to leaving said reaction vessel.

12. Oxygen storage and retrieval apparatus as set forth in claim 1 further including:

heater means for heating said conduit means to the setpoint temperature.

13. Oxygen storage and retrieval apparatus as set forth in claim 1 further comprising:

removable cover means for selectively sealing said reaction vessel and allowing access to the interior of said reaction vessel for removal therefrom of accumulations of LiCl.

14. A method of storing and retrieving oxygen comprising the steps of:

(a) heating a storage vessel containing LiClO$_4$ in the solid state until a molten bath thereof is formed;

(b) maintaining the molten bath of LiClO$_4$ at a setpoint temperature which is less than the temperature at which substantial decomposition of the LiClO$_4$ occurs;

(c) providing a reaction vessel;

(d) heating the reaction vessel to a decomposition temperature having a magnitude substantially higher than the temperature at which instantaneous decomposition of LiClO$_4$ occurs;

(e) continuously delivering molten LiClO$_4$ to the reaction vessel;

(f) directing a spray of the molten LiClO$_4$ at a heated internal surface within the reaction vessel to cause decomposition thereof into LiCl and O$_2$; and (g) withdrawing O$_2$ from the reaction vessel.

15. A method of storing and retrieving oxygen as set forth in claim 14 wherein step (e) includes the steps of:

pressurizing the storage vessel to thereby cause the molten LiClO$_4$ to flow to the reaction vessel; and controlling step (g) so as to achieve a desired flow rate of O$_2$ from the reactor vessel.

16. A method of storing and retrieving oxygen as set forth in claim 14 further comprising the steps of:
   (h) relieving the pressure in the storage vessel when it exceeds a predetermined value; and
   (i) relieving the pressure in the reaction vessel when it exceeds a predetermined value.

17. A method of storing and retrieving oxygen as set forth in claim 14 wherein the step (e) includes the step of:

pumping molten $LiClO_4$ from the storage vessel to the reaction vessel.

18. A method of storing and retrieving oxygen as set forth in claim 14 further comprising the step, prior to step (g) of:

filtering from the $O_2$ within the reaction vessel any droplets of LiCl entrained therein prior to withdrawal of the $O_2$ from the reaction vessel.

* * * * *